(12) United States Patent
Fuse et al.

(10) Patent No.: US 7,121,904 B2
(45) Date of Patent: Oct. 17, 2006

(54) WATER JET PROPULSION WATERCRAFT

(75) Inventors: Tomohiro Fuse, Saitama (JP); Hisashi Matsuo, Saitama (JP); Hiroshi Iwakami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/218,572

(22) Filed: Sep. 6, 2005

(65) Prior Publication Data

US 2006/0057908 A1   Mar. 16, 2006

(30) Foreign Application Priority Data

Sep. 14, 2004   (JP) .............................. 2004-266788

(51) Int. Cl.
*B60L 1/14* (2006.01)
(52) U.S. Cl. ................ 440/2; 440/38; 73/187
(58) Field of Classification Search .................... 440/1, 440/2, 38; 114/55.5; 73/185, 187; 324/174
See application file for complete search history.

(56) References Cited

U.S. PATENT DOCUMENTS

| | | | | |
|---|---|---|---|---|
| 5,369,360 A | * | 11/1994 | Amyot | ........................ 73/187 |
| 5,606,253 A | * | 2/1997 | Boucher et al. | ............... 73/187 |
| 5,699,749 A | * | 12/1997 | Yamada et al. | ............... 73/187 |
| 5,894,087 A | * | 4/1999 | Ohtuka et al. | ................ 73/185 |
| 6,101,965 A | * | 8/2000 | Koyanagi | ................... 114/55.5 |
| 6,213,041 B1 | * | 4/2001 | Kojima et al. | ................. 440/2 |
| 6,676,461 B1 | * | 1/2004 | Hasegawa et al. | ............. 440/2 |

FOREIGN PATENT DOCUMENTS

JP   10-129583 A   5/1998

* cited by examiner

*Primary Examiner*—Lars A. Olson
(74) *Attorney, Agent, or Firm*—Birch, Stewart, Kolasch & Birch, LLP (57) ABSTRACT

A water jet propulsion watercraft that allows accurate speed detection of a speed detection unit to be achieved. A water jet propulsion watercraft includes a hull bottom plate with left and right guide grooves for guiding water rearwardly of the hull. The left and right guide grooves are disposed in a fore-and-aft direction at an area excluding at least a front portion of the hull bottom plate. Further, the hull bottom plate includes a flat surface formed at the front portion of the left and right guide grooves and on a surface facing the water. The flat surface is provided with an opening for guiding water to a speed detection unit.

20 Claims, 7 Drawing Sheets

ABSTRACT

WATER JET PROPULSION WATERCRAFT

CROSS-REFERENCE TO RELATED APPLICATIONS

The present application claims priority under 35 USC 119 to Japanese Patent Application No. 2004-266788 filed on Sep. 14, 2004 the entire contents of which are hereby incorporated by reference.

1. Field of the Invention

The present invention relates to a water jet propulsion watercraft having a speed detection unit disposed in an opening portion of a hull bottom plate, the speed detection unit being operated by water flow so that the propulsion speed can be detected while the hull is being propelled.

2. Descrription of Background Art

One known example of a small watercraft is a water jet propulsion watercraft having a water jet pump mounted at a rear portion of a hull for driving the water jet pump to draw in the water from a hull bottom and to expel the water drawn in rearwardly of the hull to propel the watercraft.

The water jet propulsion watercraft includes a speed detection unit disposed on a hull bottom plate at the rear portion of the hull, for detecting the propulsion speed. See, for example, Japanese Patent Laid-Open No. Hei 10-129583.

Figure 8:
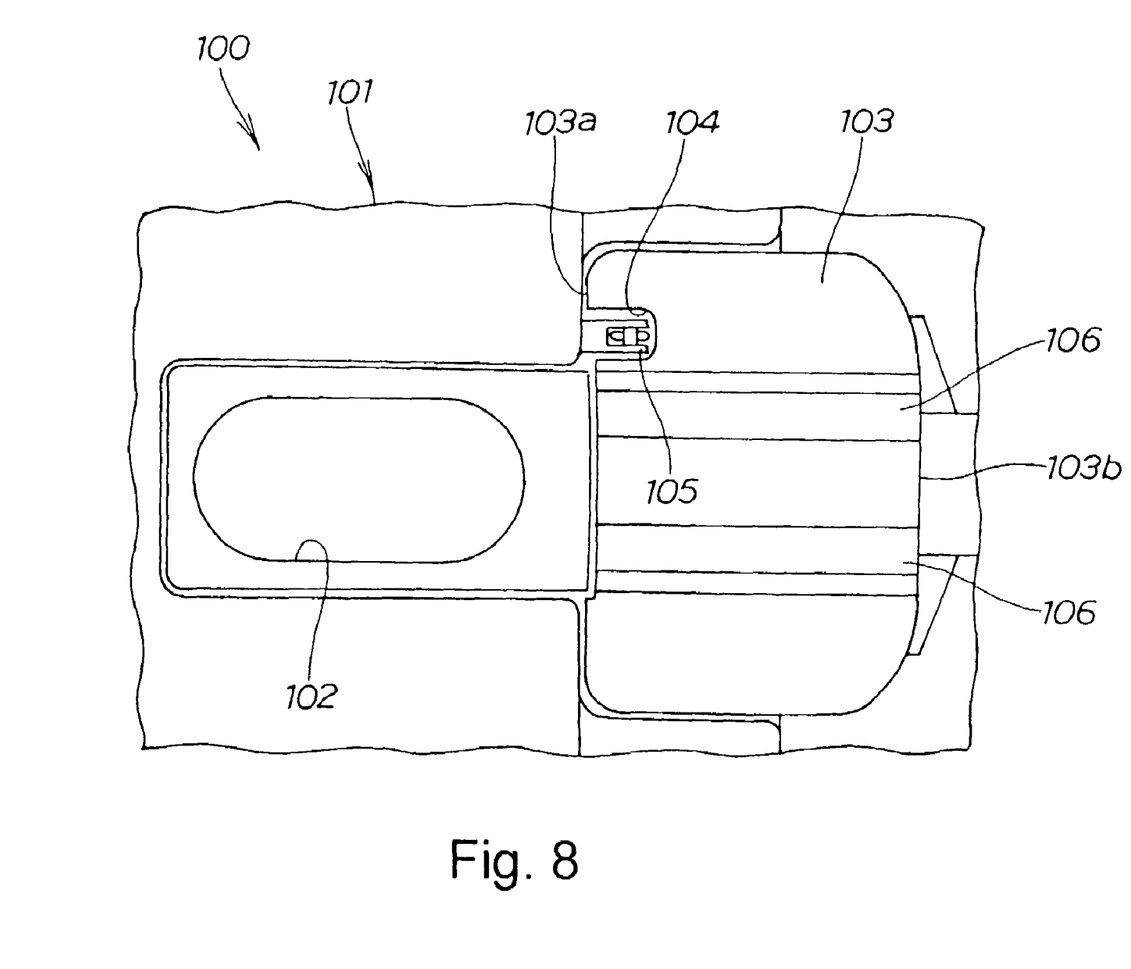
FIG. 8 is a view for illustrating a basic construction of the conventional art.

The disclosure set forth in Japanese Patent Laid-Open No. Hei 10-129583 will be described below with reference to FIG. 8 of the drawings. FIG. 8 is a view for illustrating a basic construction of the conventional art.

A water jet propulsion watercraft 100 includes a hull 101, a water jet pump (not shown), a hull bottom plate 103, a cutout portion 104, a speed detection unit 105, and right and left guide grooves 106, 106. The water jet pump is disposed at a rear portion of the hull 101. The hull bottom plate 103 is disposed at a position downward of the water jet pump and rearward of an intake port 102. The cutout portion 104 is disposed at a front end 103a on the left-hand side of the hull bottom plate 103. The speed detection unit 105 is disposed at the cutout portion 104. The right and left guide grooves 106, 106 extend from the front end 103a to a rear end 103b of the hull bottom plate 103 so as to circumvent the cutout portion 104.

According to the water jet propulsion watercraft 100, when the hull 101 is propelled by the water jet pump, water is guided rearwardly of the hull 101 through the right and left guide grooves 106, 106.

A good straight line stability of the hull 101 is secured by letting water flow rearwardly of the hull 101 through the right and left guide grooves 106, 106.

At the same time, the speed detection unit 105 disposed at the cutout portion 104 is operated for detecting the propulsion speed of the hull 101.

The right and left guide grooves 106, 106 extend all the way from the front end 103a to the rear end 103b of the hull bottom plate 103. An area, at which the cutout portion 104 is disposed, is therefore limited to one between, or outside, the right and left guide grooves 106, 106.

Now, the water jet pump is disposed between the right and left guide grooves 106, 106. This eliminates the possibility that the speed detection unit 105 will be placed in this area.

The hull bottom plate 103 therefore includes the cutout portion 104 disposed at a position outside and near the left guide groove 106. The speed detection unit 105 is placed in this cutout portion 104.

Each of the right and left guide grooves 106, 106 is, however, formed into a recess. A disturbance of water flow therefore occurs in areas beside and near the right and left guide grooves 106, 106.

This results in water flowing in the cutout portion 104 being disturbed. If the speed detection unit 105 is operated using water having a disturbed water flow, it is difficult to properly operate the speed detection unit 105.

Moreover, it is required that the right and left guide grooves 106, 106 are formed so as to circumvent the cutout portion 104. Accordingly, restrictions of the cutout portion 104 are imposed on the shape of the right and left guide grooves 106, 106. It is therefore highly likely that forming the right and left guide grooves 106, 106 into a desired shape will be a difficult task to carry out.

SUMMARY AND OBJECTS OF THE INVENTION

It is therefore an object of the present :Invention to provide a water jet propulsion watercraft that allows speed detection accuracy of a speed detection unit to be achieved and right and left guide grooves to be formed into a desired shape.

In accordance with one aspect of the present invention, there is provided a water jet propulsion watercraft including: a water jet pump disposed at a rear portion of a hull with a hull bottom plate disposed downwardly of the water jet pump. The hull bottom plate includes an opening and a speed detection unit is disposed at the opening. The water jet propulsion watercraft detects a propulsion speed of the hull by using the speed detection unit at the opening adapted to be operable with water when the hull is propelled by the water jet pump. The water jet propulsion watercraft includes the following points. More specifically, the hull bottom plate includes a guide groove disposed in a fore-and-aft direction at an area of the hull bottom plate excluding at least a front portion thereof. The guide groove guides water rearwardly of the hull. Further, the hull bottom plate also includes a flat surface formed at a front portion of the guide groove and on a surface facing the water. The flat surface includes the opening.

The flat surface is formed at the front portion of the hull bottom plate and on the surface facing the water. The opening is disposed in the flat surface. No disturbance occurs in a flow of water that flows along the flat surface.

Accordingly, providing the flat surface with the opening allows a disturbance-free flow of water to be drawn to the opening.

The speed detection unit can therefore be operated with a disturbance-free flow of water introduced thereto. It is therefore possible to preferably operate the speed detection unit preferably.

Further, the guide groove is disposed at the area excluding the front portion of the hull bottom plate. In addition, the front portion of the hull bottom plate includes the opening. The opening is thus disposed forwardly and away from the guide groove.

Accordingly, the guide groove can be shaped without being restricted by the opening.

According to another aspect of the present invention, the hull bottom plate includes the guide groove disposed on each of the left-hand side and the right-hand side of the hull bottom plate.

The hull bottom plate includes two guide grooves, one on the left-hand side thereof and the other on the right-hand side thereof. When the hull is moved forward, water is guided along the left and right guide grooves from a forward to rearward side. A good straight line stability of the hull can therefore be achieved.

Providing the guide grooves on both the left-hand side and the right-hand side of the hull bottom plate causes the left guide groove to get in the water as the hull is turned to the left.

This prevents a rear portion of the hull from skidding outwardly during the left turn, thus allowing the hull to be turned to the left to be true with a feel of an operator.

Further, when the hull is turned to the right, the right guide groove gets in the water.

This prevents the rear portion of the hull from skidding outwardly during the right turn, thus allowing the hull to be turned to the right to be true with a feel of the operator.

According to still another aspect of the present invention, the guide groove is formed to have a depth that becomes gradually deeper toward a rear end portion as compared with the depth at a front end portion.

The guide groove is formed to have a depth that becomes gradually deeper towards the rear end portion than the depth at the front end portion. This allows the water flowing in the guide groove to be smoothly guided rearwardly.

Guiding water smoothly rearwardly helps suppress water resistance.

According to the first aspect of the present invention, the disturbance-free water is introduced to the speed detection unit so as to allow the speed detection unit to be operated under preferable conditions. This provides the advantage that good speed detection accuracy can be achieved of the speed detection unit.

In addition, there is another advantage since the guide groove can be shaped arbitrarily because the shape of the guide groove is not determined by the restriction of the opening.

According to the second aspect of the present invention, the hull bottom plate includes two guide grooves, one on the left-hand side thereof and the other on the right-hand side thereof. This provides the advantages that a good straight line stability of the hull can be achieved and that preferable operability can be achieved by preventing the rear portion of the hull from skidding outwardly during turning.

According to the third aspect of the present invention, water that flows in the guide groove is guided smoothly rearwardly. This provides the advantage that water resistance can be suppressed, thereby enhancing the propulsion performance.

Further scope of applicability of the present invention will become apparent from the detailed description given hereinafter. However, it should be understood that the detailed description and specific examples, while indicating preferred embodiments of the invention, are given by way of illustration only, since various changes and modification's within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The best mode for carrying out the present invention will be described below with reference to the accompanying drawings. For the purpose of this specification, "front," "rear," "left," and "right" denote corresponding directions as viewed from an operator of the watercraft. In addition, "Fr" denotes forward, "Rr" denotes rearward, "L" denotes leftward, and "R" denotes rightward.

Figure 1:
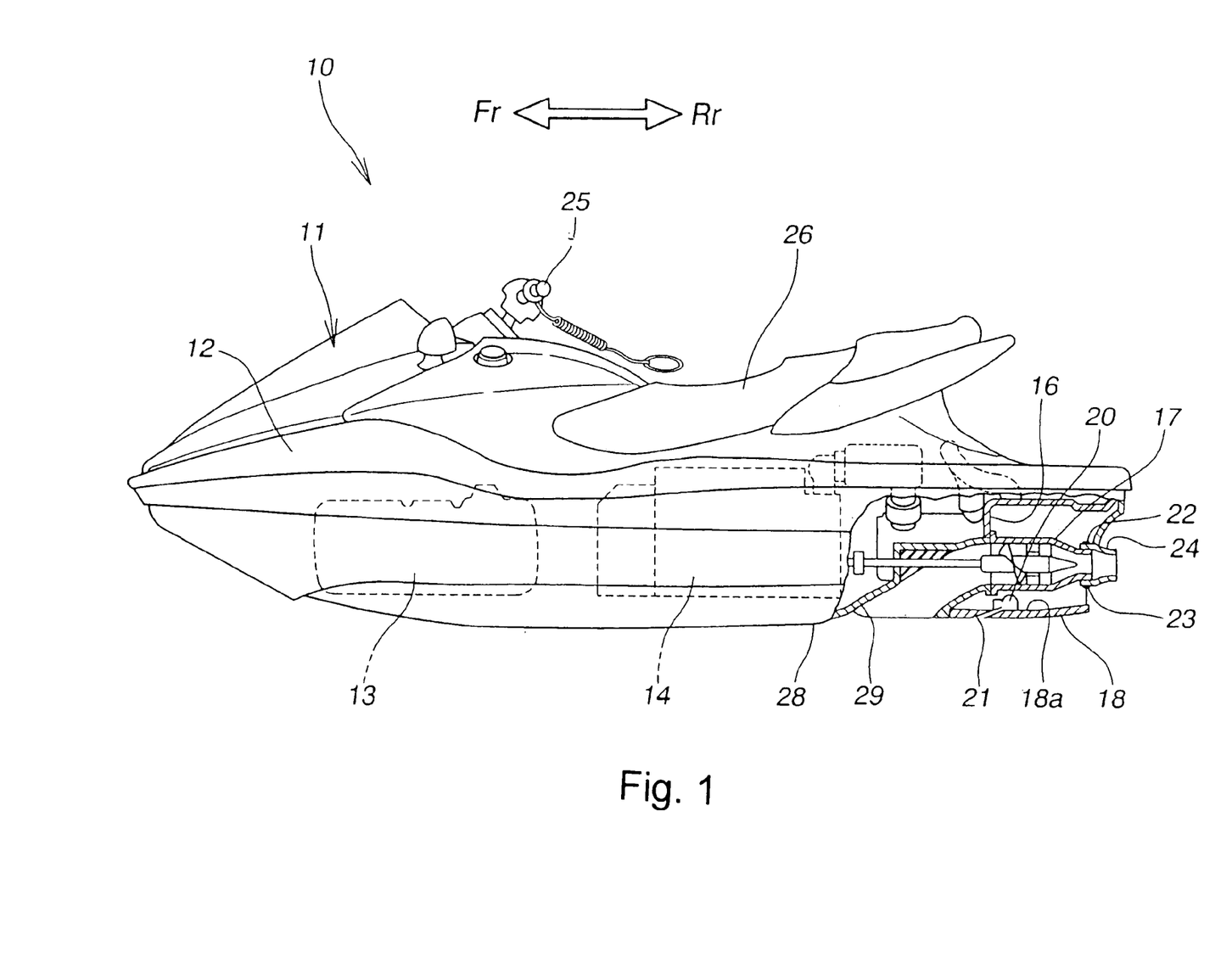
FIG. 1 is a side elevational view showing a water jet propulsion watercraft according to a first preferred embodiment of the present invention.

FIG. 1 is a side elevational view showing a water jet propulsion watercraft according to a first preferred embodiment of the present invention.

Figure 2:
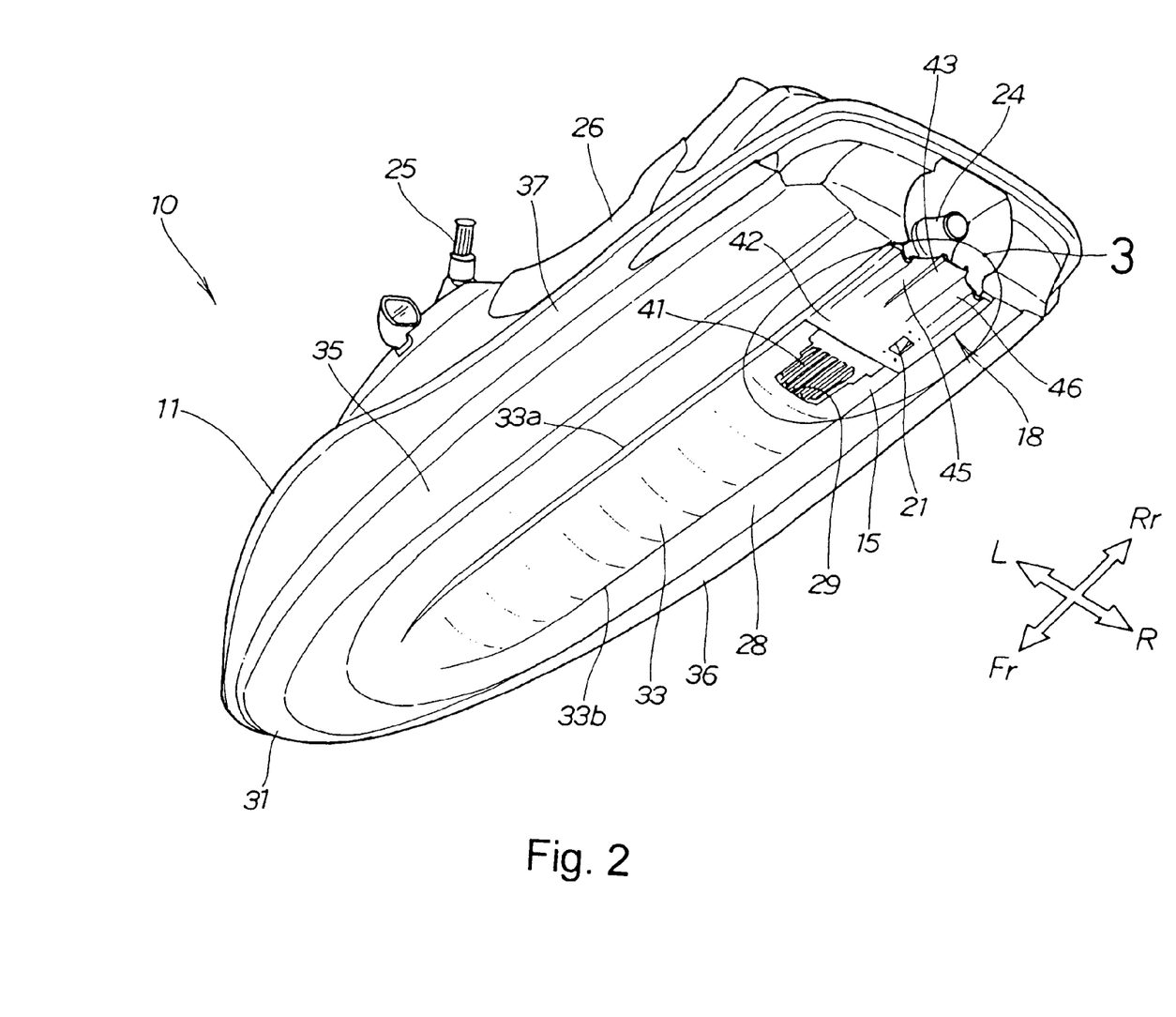
FIG. 2 is a perspective view showing the water jet propulsion watercraft according to the first preferred embodiment of the present invention, as viewed from a bottom rearward direction.
Figures 3A, 3B:
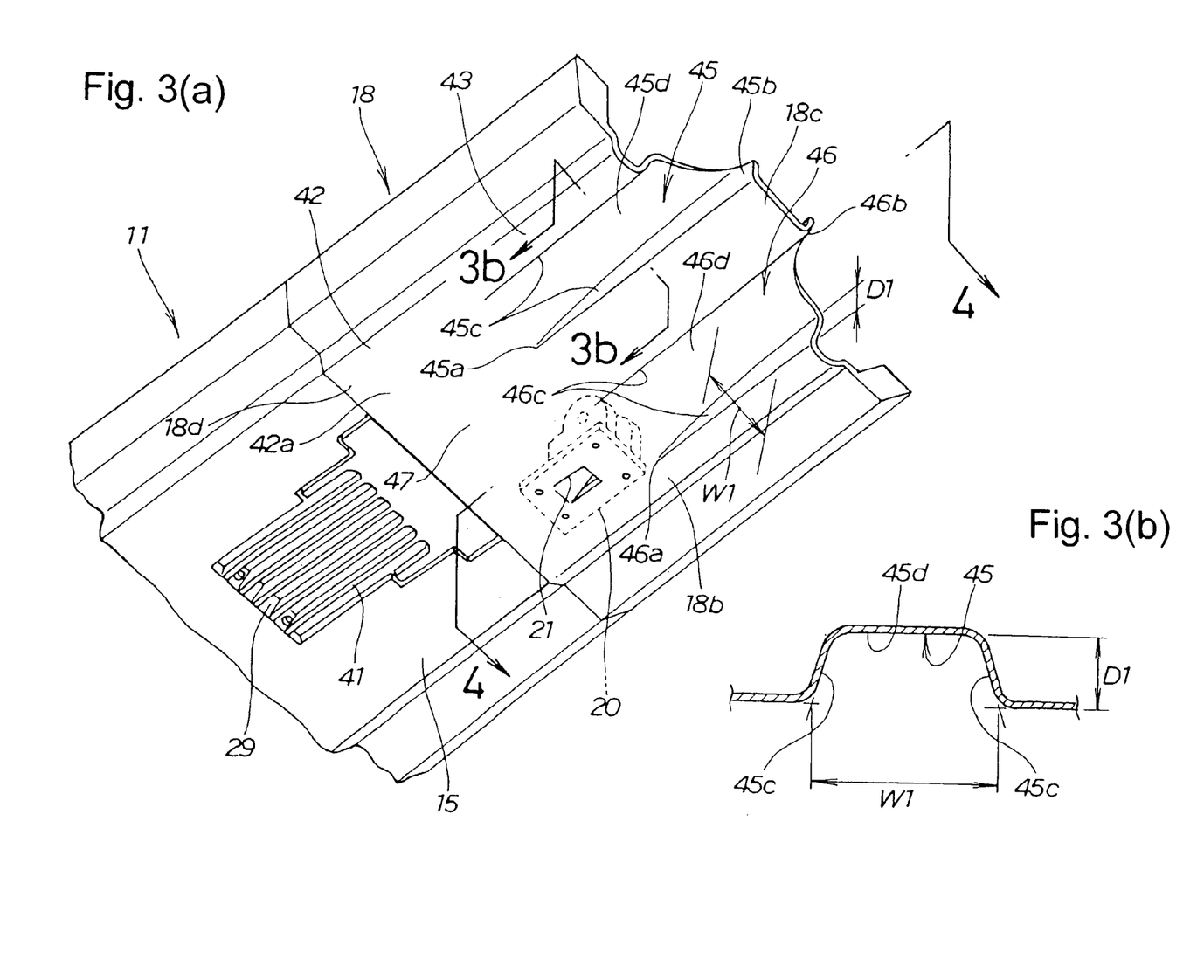
FIG. 3(a) is an enlarged view showing part 3 of FIG. 2.
FIG. 3(b) is a cross-sectional view taken along line 3b—3b of FIG. 3(a)

A water jet propulsion watercraft 10 according to the first preferred embodiment of the present invention includes a fuel tank 13, an engine 14, a jet pump chamber 16, a water jet pump 17, a hull bottom plate 18, a speed detection unit 20 and an opening 21 See also FIGS. 2 and 3. The fuel tank 13 is disposed at a front portion 12 of a hull 11. The engine 14 is disposed rearward of the fuel tank 13. The jet pump chamber 16 is disposed at a stem (a rear portion of the hull) 15 located rearward of the engine 14. The water jet pump 17 is disposed inside the jet pump chamber 16. The hull bottom plate 18 is disposed downward of the water jet pump 17. The speed detection unit 20 is disposed on a top surface 18a of the hull bottom plate 18. The opening 21 is located forward of the speed detection unit 20.

The water jet propulsion watercraft 10 further includes a steering nozzle 24, a steering handlebar 25 and a seat 26. The steering nozzle 24 is disposed rearward of the water jet pump 17 and mounted swingably to the right and left via upper and lower pins 22, 23. The steering handlebar 25 for swingably operating the steering nozzle 24 is disposed upward of the fuel tank 13. The seat 26 is disposed rearward of the steering handlebar 25.

The hull bottom plate 18 functions to let the front portion 12 of the hull 11 fly above the water as the water jet propulsion watercraft 10 planes. The hull bottom plate 18 is referred to as ride plate.

According to the water jet propulsion watercraft 10, water is drawn in through an intake port 29 in a hull bottom 28 and the water thus drawn in is expelled rearwardly from the steering nozzle 24 of the water jet pump 17. The hull 11 is thereby propelled.

When the hull 11 is propelled, water is drawn in through the opening 21 and is then used to operate the speed detection unit 20. The propulsion speed of the hull 11 is thereby detected.

FIG. 2 is a perspective view showing the water jet propulsion watercraft according to the first preferred embodiment of the present invention, as viewed from a bottom rearward direction. FIG. 3(a) is an enlarged view showing part 3 of FIG. 2. FIG. 3(b) is a cross-sectional view taken along line 3b—3b of FIG. 3(a).

The water jet propulsion watercraft 10 includes a keel 33, left and right inclined surfaces 35, 36, and left and right wall surfaces 37 (the right wall surface not shown in FIG. 2). The keel 33 extends from a bow 31 to the stern 15 and is disposed in a central location in a width direction of the hull bottom 28. The keel 33 is formed arcuately in the width direction of the hull 11. The left and right inclined surfaces 35, 36 extend outwardly in the width direction from left-hand and right-hand sides 33a, 33b, respectively, of the keel 33. The left and right wall surfaces 37 extend substantially perpendicularly from an outside of the left and right inclined surfaces 35, 36.

The keel 33 includes the intake port 29 provided on the side of the stem 15. The intake port 29 includes a plurality of lattice members 41 ... ( ... indicates a plurality of members). The hull bottom plate 18 is disposed rearward of these lattice members 41 .... The hull bottom plate 18 includes a left guide groove (guide groove) 45 and a right guide groove (guide groove) 46 for guiding water rearwardly of the hull 11. The left and right guide grooves 45, 46 are disposed in a fore-and-aft direction at an area 43 excluding at least a front portion 42 of the hull bottom plate 18.

Further, the hull bottom plate 18 includes a flat surface 47 formed at the front portion 42 of the left and right guide grooves 45, 46 and on a surface 42a facing the water. The flat surface 47 is provided with the opening 21. The speed detection unit 20 is disposed on the top surface 18a (see also FIGS. 1 and 4) rearward of the opening 21.

The opening 21 is located at an intermediary area in the fore-and-aft direction of the flat surface 47 and at an area more on the right-hand side. The opening 21 is a substantially rectangular through hole formed with four sides.

The reason why the opening 21 is disposed more on the right-hand side is as follows. More specifically, the water jet pump 17 is disposed at a center in the width direction of the flat surface 47. This makes it difficult to secure a space, in which the speed detection unit 20 is mounted.

The left guide groove 45 extends linearly in a plan view from substantially a central portion 18b to a rear end portion 18c on the left-hand side of the hull bottom plate 18.

The left guide groove 45 has a substantially U-shaped cross section, including inner and outer side walls 45c, 45c and a vertex portion 45d. The vertex portion 45d is formed to be flat.

In addition, the left guide groove 45 is formed such that a groove depth D1 becomes gradually deeper toward a rear end portion 45b as compared with the depth at a front end portion 45a. The left guide groove 45 is also formed such that a groove width W1 is constant throughout an area from the front end portion 45a to the rear end portion 45b.

Similarly, as with the left guide groove 45, the right guide groove 46 extends linearly in a plan view from substantially the central portion 18b to the rear end portion 18c on the right-hand side of the hull bottom plate 18.

Like the left guide groove 45, the right guide groove 46 has a substantially U-shaped cross section, including inner and outer side walls 46c, 46c and a vertex portion 46d. The vertex portion 46c is flatly formed.

Further, like the left guide groove 45, the right guide groove 46 is formed such that a groove depth D1 becomes gradually deeper toward a rear end portion 46b as compared with the depth at a front end portion 46a. The right guide groove 46 is also formed such that a groove width W1 is constant throughout an area from the front end portion 46a to the rear end portion 46b.

According to the water jet propulsion watercraft 10, the intake port, through which water is drawn in to the speed detection unit 20, is the opening 21 that is generally rectangular in shape. This eliminates the necessity to form a recessed portion midway to a front end portion (end portion) 18d of the hull bottom plate 18.

Further, the left and right guide grooves 45, 46 are disposed at the area 43 excluding the front portion 42 of the hull bottom plate 18. In addition, the front portion 42 of the hull bottom plate 18 includes the opening 21. The opening 21 is thus disposed forwardly and away from the left and right guide grooves 45, 46.

Accordingly, the left and right guide grooves 45, 46 can be shaped without being restricted by the opening 21.

Figure 4:
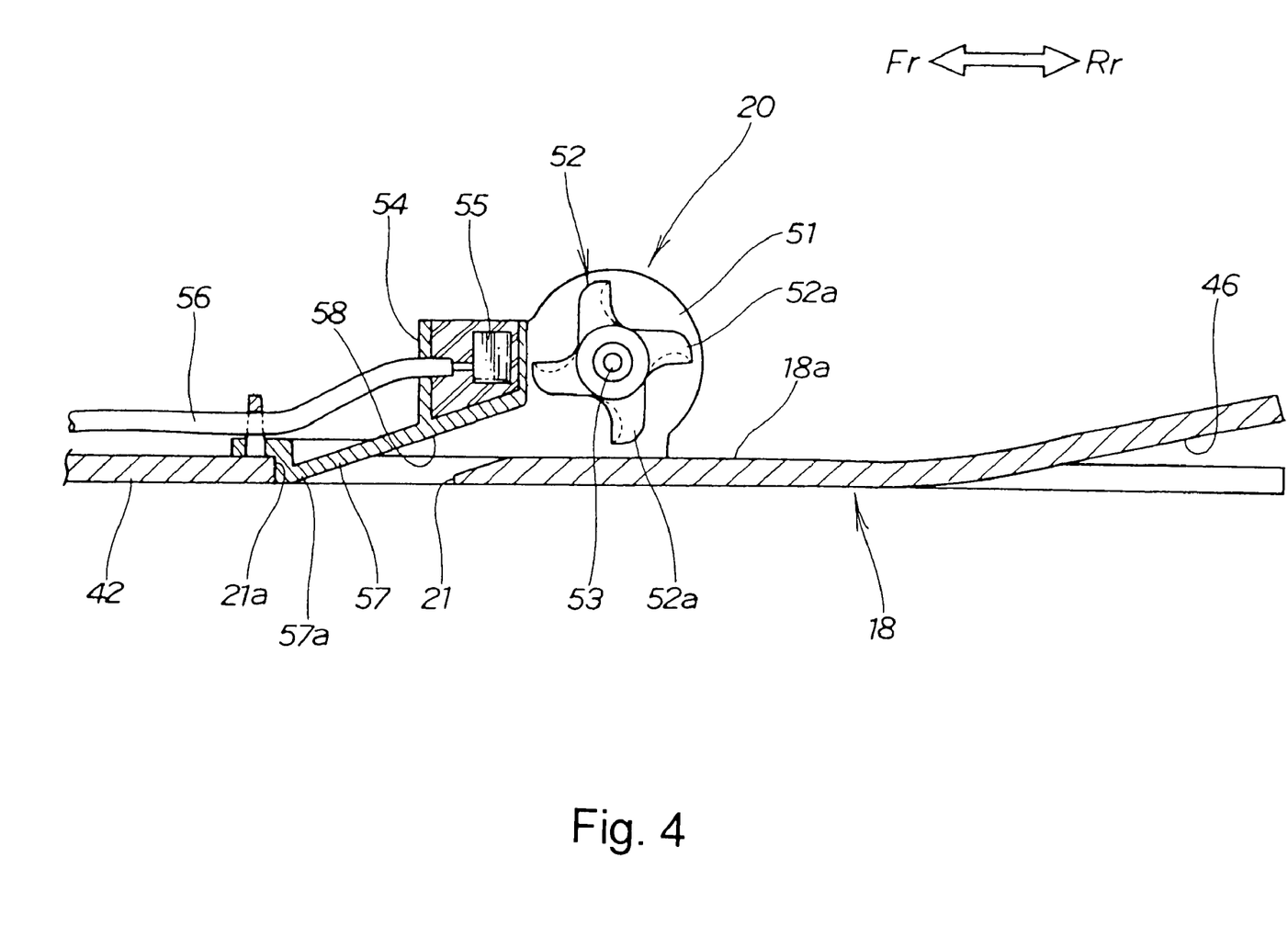
FIG. 4 is a cross-sectional view taken along line 4—4 of FIG. 3(a)

FIG. 4 is a cross-sectional view taken along line 4—4 of FIG. 3(a).

The speed detection unit 20 is constructed as follows. More specifically, a paddle 52 is rotatably disposed via a shaft 53 in a case 51 placed on the top surface 18a at the front portion 42 of the hull bottom plate 18. A sensor main body 55 is disposed inside a sensor accommodation portion 54. The sensor main body 55 is connected to a speedometer (not shown) via a harness 56.

According to the speed detection unit 20, a front insertion portion 57 is inserted in the opening 21 in the hull bottom plate 18. A leading end 57a of the front insertion portion 57 is then abutted against a front wall surface 21a of the opening 21. The opening 21 is thereby brought into communication with a water guide path 58. Vanes 52a ... of the paddle 52 are thus made to face an outlet of the water guide path 58.

Water drawn in through the opening 21 in the hull bottom plate 18 is guided to the water guide path 58. Water that flows past the water guide path 58 is directed to flow rearwardly from the outlet of the water guide path 58. The water is then directed to hit against the vanes 52a ... of the paddle 52.

When the water hits against the vanes 52a ... of the paddle 52, the paddle 52 is rotated counterclockwise about the shaft 53.

When the propulsion speed of the hull 11 (see FIG. 1) is high, the flow rate of the water flowing through the water guide path 58 increases, making the paddle 52 to rotate at high speeds.

When the propulsion speed of the hull 11 is low, on the other hand, the flow rate of the water flowing through the water guide path 58 decreases, making the paddle 52 to rotate at low speeds.

The water jet propulsion watercraft 10 in operation will be described with reference to FIGS. 1, 5, and 6.

Referring back to FIG. 1, the water jet pump 17 is driven by the engine 14 of the water jet propulsion watercraft 10, thus causing water to be drawn in through the intake port 29 in the hull bottom 28.

The water thus drawn in is expelled rearwardly from the steering nozzle 24 of the water jet pump 17, thereby propelling the hull 11.

Figure 5:
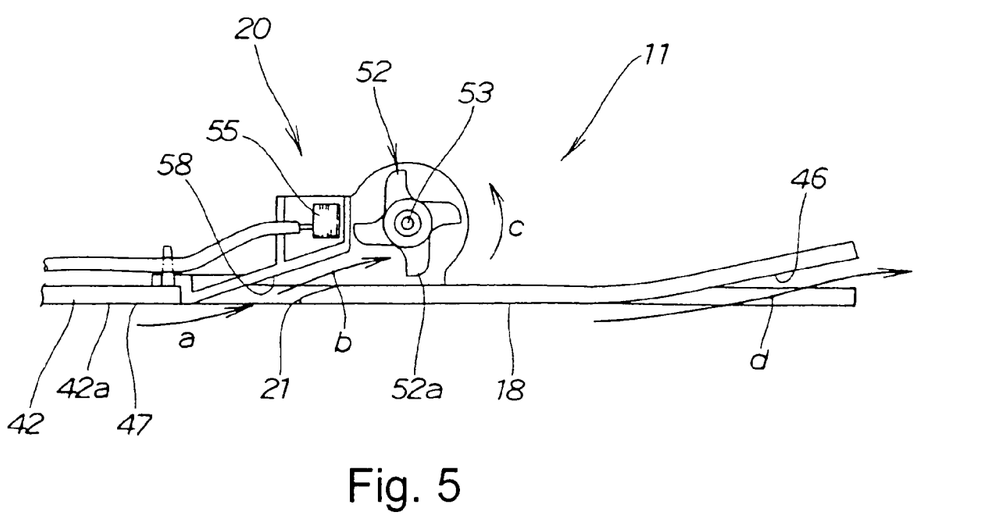
FIG. 5 is a view for illustrating the operation of a speed detection unit of the water jet propulsion watercraft according to the first preferred embodiment of the present invention.

FIG. 5 is a view for illustrating the operation of the speed detection unit of the water jet propulsion watercraft according to the first preferred embodiment of the present invention.

While the hull 11 is being propelled, water is drawn in through the opening 21 in the hull bottom plate 18 as shown by an arrow a. The water thus drawn in is guided to the water guide path 58. The water that has flowed past the water guide path 58 is made to flow rearwardly from the outlet of the water guide path 58 as shown by an arrow b. The water is then directed to hit against the vanes 52a . . . of the paddle 52.

When the water hits against the vanes 52a . . . of the paddle 52, the paddle 52 is rotated counterclockwise about the shaft 53 as shown by an arrow c.

Rotation of the paddle 52 about the shaft 53 changes the magnetic field. The sensor main body 55 detects the speed of the paddle 52 based on the change in the magnetic field.

A detected signal is relayed from the sensor main body 55 to the speedometer which then reads the propulsion speed of the hull 11.

It is to be noted that the flat surface 47 is formed at the front portion 42 of the hull bottom plate 18 and on the surface 42a facing the water. The opening 21 is disposed in the flat surface 47. No disturbance occurs in a flow of water that flows along the flat surface 47.

Providing the flat surface 47 with the opening 21 allows a disturbance-free flow of water to be drawn in through the opening 21.

As a result, the speed detection unit 20 is operated in preferable conditions by introducing the disturbance-free flow of water thereto. Good speed detection accuracy can thereby be achieved.

Figure 6:
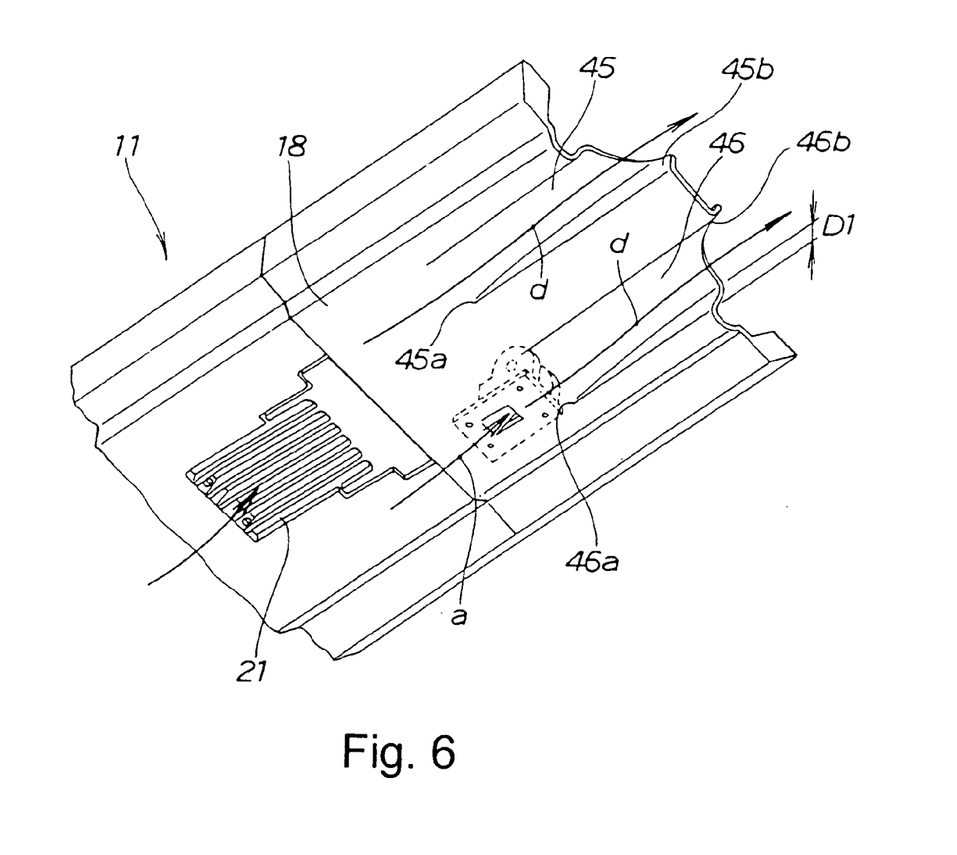
FIG. 6 is a view for illustrating the operation of the left and right guide grooves of the water jet propulsion watercraft according to the first preferred embodiment of the present invention.

FIG. 6 is a view for illustrating the operation of the left and right guide grooves of the water jet propulsion watercraft according to the first preferred embodiment of the present invention.

During propulsion of the water jet propulsion watercraft 10, the water is caused to flow along the left and right guide grooves 45, 46 as shown by an arrow d.

Making the water flow along the left and right guide grooves 45, 46 as shown by the arrow d allows the water to flow positively rearwardly of the hull 11. This makes it possible to secure straight line stability of the hull 11.

When the hull 11 is to be turned to the left, the left guide groove 45 is in the water so that the left guide groove 45 can prevent the hull bottom plate 18 from skidding outwardly. This allows the hull 11 to be turned to the left with a turning radius that matches with a feel of an operator of the hull 11.

When the hull 11 is to be turned to the right, the right guide groove 46 is in the water so that the right guide groove 46 can prevent the hull bottom plate 18 from skidding outwardly. This allows the hull 11 to be turned to the right with a turning radius that matches with a feel of the operator of the hull 11.

In addition, each of the left and right guide grooves 45, 46 is formed such that the groove depth D1 becomes gradually deeper towards a corresponding one of the rear end portions 45b, 46b as compared with the depth at a corresponding one of the front end portions 45a, 46a.

This arrangement allows water that flows in the left and right guide grooves 45, 46 to flow smoothly toward the rear end portions 45b, 46b.

Accordingly, water resistance can be minimized for an enhanced propulsion performance.

A water jet propulsion watercraft according to a second preferred embodiment of the present invention will be described with reference to FIGS. 7(a) and 7(b). In a water jet propulsion watercraft 70 according to the second preferred embodiment of the present invention, parts similar to those found in the water jet propulsion watercraft according to the first preferred embodiment of the present invention are identified by the same reference numerals as those used heretofore, with descriptions for the same being omitted.

Figures 7A, 7B:
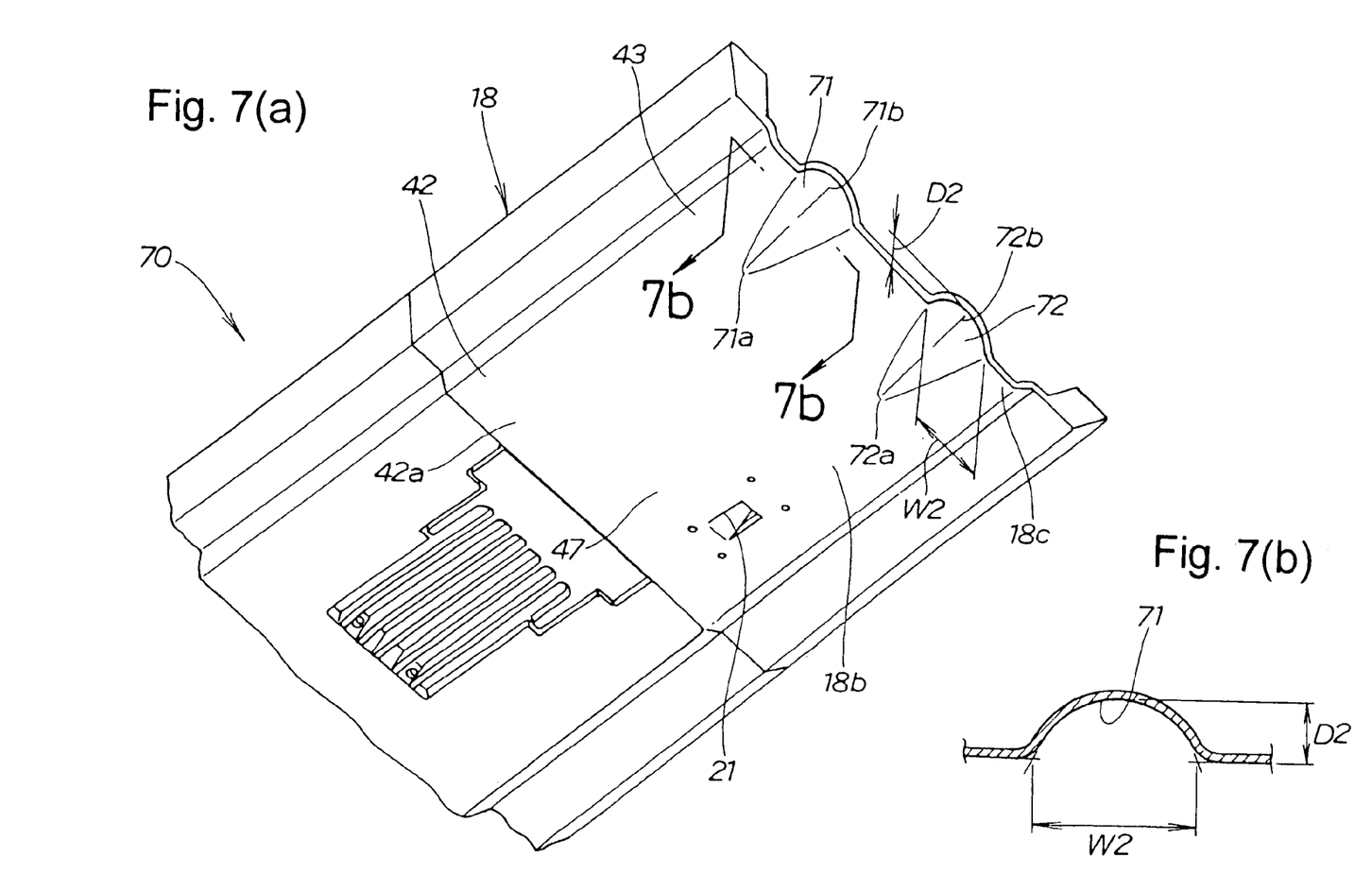
FIG. 7(a) is a perspective view showing a principal part of a water jet propulsion watercraft according to a second preferred embodiment of the present invention.
FIG. 7(b) is a cross-sectional view taken along 7b—7b of FIG. 7(a)

FIG. 7(a) is a perspective view showing a principal part of the water jet propulsion watercraft according to the second preferred embodiment of the present invention. FIG. 7(b) is a cross-sectional view taken along 7b—7b of FIG. 7(a).

The water jet propulsion watercraft 70 according to the second preferred embodiment of the present invention is characterized as follows. More specifically, a hull bottom plate 18 includes a left guide groove (guide groove) 71 and a right guide groove (guide groove) 72 for guiding water rearwardly of a hull 11. The left and right guide grooves 71, 72 are disposed in a fore-aft direction at an area 43 excluding at least a front portion 42 of the hull bottom plate 18. Further, the hull bottom plate 18 includes a flat surface 47 formed at the front portion 42 of the left and right guide grooves 71, 72 and on a surface 42a facing the water. The flat surface 47 is provided with an opening 21. A speed detection unit 20 is disposed on a top surface 18a (see FIGS. 1 and 4) rearward of the opening 21.

That is, the water jet propulsion watercraft 70 according to the second preferred embodiment of the present invention is constructed in the same manner as the water jet propulsion watercraft 10 according to the first preferred embodiment of the present invention, except for the left and right guide grooves 71, 72.

The left guide groove 71 extends, in the left-hand side of the hull bottom plate 18, from substantially a point rearward of a central portion 18b to a rear end portion 18c. The left guide groove 71 has a substantially arcuate cross section.

The left guide groove 71 is formed such that a groove depth D2 becomes gradually deeper toward a rear end portion 71b as compared with the depth at a front end portion 71a. The left guide groove 71 is also formed such that a groove width W2 becomes gradually wider toward the rear end portion 71b as compared with the width at the front end portion 71a.

Similarly, like the left guide groove 71, the right guide groove 72 extends, on the right-hand side of the hull bottom plate 18, from substantially a point rearward of the central portion 18b to the rear end portion 18c. The right guide groove 72 has a substantially arcuate cross section. The right guide groove 72 is formed such that a groove depth D2 becomes gradually deeper toward a rear end portion 72b as compared with the depth at a front end portion 72a. The right guide groove 72 is also formed such that a groove width W2 becomes gradually wider toward the rear end portion 72b as compared with the width at the front end portion 72a.

According to the water jet propulsion watercraft 70 according to the second preferred embodiment of the present invention, the same effects as those achieved from the water jet propulsion watercraft 10 according to the first preferred embodiment of the present invention can be achieved.

While the present invention has been described in only the first preferred embodiment, in which the left and right guide grooves 45, 46 are formed to have a substantially U-shaped cross section and the second preferred embodiment, in which the left and right guide grooves 71, 72 are formed to have a substantially arcuate cross section, it should be apparent to those skilled in the art that the cross-sectional shape of the guide grooves is not so limited; but any arbitrary cross-sectional shape can be adopted.

While the present invention has been described in the first preferred embodiment, in which the left and right guide grooves 45, 46 are formed such that the groove width W1 is constant throughout the area from the front end portion 45a to the rear end portion 45b. The arrangement is not so limited, but the groove width W1 may be formed to become gradually wider toward the rear end portion 45b as compared with the width at the front end portion 45a.

Further, while the present invention has been described in the first and second preferred embodiments, in which the speed detection unit 20 is disposed on the top surface 18a rearward of the opening 21. The speed detection unit is not limited to this exemplified one.

The present invention can be preferably applied to a water jet propulsion watercraft having a speed detection unit disposed at an opening portion in a hull bottom plate, the speed detection unit being operated by a water flow so that a propulsion speed can be detected while the hull is being propelled.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A water jet propulsion watercraft, comprising:
    a water jet pump disposed at a rear portion of a hull;
    a hull bottom plate disposed downwardly of the water jet pump, the hull bottom plate including an opening; and
    a speed detection unit disposed at the opening, said water jet propulsion watercraft detecting a propulsion speed of the hull by using the speed detection unit at the opening adapted to be operated with water when the hull is propelled by the water jet pump;
    wherein the hull bottom plate includes a guide groove disposed in a fore-aft direction at an area of the hull bottom plate excluding at least a front portion thereof, the guide groove guides water rearwardly of the hull; and
    wherein the hull bottom plate includes a flat surface formed at a front portion of the guide groove and on a surface facing the water and the flat surface includes the opening.

2. The water jet propulsion watercraft according to claim 1, wherein the hull bottom plate includes the guide groove disposed on each of the left-hand side and the right-hand side of the hull bottom plate.

3. The water jet propulsion watercraft according to claim 1, wherein the guide groove is formed to have a depth that becomes gradually deeper toward a rear end portion as compared with a depth at a front end portion.

4. The water jet propulsion watercraft according to claim 2, wherein by forming the left-hand side guide groove on the left-hand side of the watercraft allows the left-hand side guide groove to be positioned in water when the hull is turned to the left.

5. The water jet propulsion watercraft according to claim 2, wherein by forming the right-hand side guide groove on the right-hand side of the watercraft allows the right-hand side guide groove to be positioned in water when the hull is turned to the right.

6. The water jet propulsion watercraft according to claim 3, wherein forming the guide groove to have a depth that becomes gradually deeper towards a rear end portion as compared to the depth at a front end portion allows the water to be smoothly guided rearwardly.

7. The water jet propulsion watercraft according to claim 1, wherein the guide groove has a substantially U-shape.

8. The water jet propulsion watercraft according to claim 1, wherein the guide groove has a substantially arcuate shape.

9. The water jet propulsion watercraft according to claim 1, wherein the speed detection unit includes a paddle rotatably disposed in a case with a sensor main body being disposed with a sensor accommodation portion, said speed detection unit being operatively connected to a speedometer.

10. The water jet propulsion watercraft according to claim 9, wherein the speed detection unit includes a front insertion portion for inserting within the opening in the hull bottom plate and for abutting against a front wall surface for providing a water communication path to said paddle.

11. A speed detection device for use with a water jet propulsion watercraft, comprising:
    a hull bottom plate including an opening therein; and
    a speed detection unit disposed within the opening, said water jet propulsion watercraft detecting a propulsion speed of the hull by using the speed detection unit within the opening adapted to be operated with water when the hull is propelled in the water;
    a guide groove formed in the hull bottom plate, said guide groove being disposed in a fore-aft direction at an area of the hull bottom plate excluding at least a front portion thereof, the guide groove guides water rearwardly of the hull; and
    a flat surface formed on the hull bottom plate at a front portion of the guide groove and on a surface facing the water, said flat surface includes the opening.

12. The water jet propulsion watercraft according to claim 11, wherein the hull bottom plate includes the guide groove disposed on each of the left-hand side and the right-hand side of the hull bottom plate.

13. The water jet propulsion watercraft according to claim 11, wherein the guide groove is formed to have a depth that becomes gradually deeper toward a rear end portion as compared with a depth at a front end portion.

14. The water jet propulsion watercraft according to claim 12, wherein by forming the left-hand side guide groove on the left-hand side of the watercraft allows the left-hand side guide groove to be positioned in water when the hull is turned to the left.

15. The water jet propulsion watercraft according to claim 12, wherein by forming the right-hand side guide groove on the right-hand side of the watercraft allows the right-hand side guide groove to be positioned in water when the hull is turned to the right.

16. The water jet propulsion watercraft according to claim 13, wherein forming the guide groove to have a depth that becomes gradually deeper towards a rear end portion as compared to the depth at a front end portion allows the water to be smoothly guided rearwardly.

17. The water jet propulsion watercraft according to claim 11, wherein the guide groove has a substantially U-shape.

18. The water jet propulsion watercraft according to claim 11, wherein the guide groove has a substantially arcuate shape.

19. The water jet propulsion watercraft according to claim 11, wherein the speed detection unit includes a paddle rotatably disposed in a case with a sensor main body being disposed with a sensor accommodation portion, said speed detection unit being operatively connected to a speedometer.

20. The water jet propulsion watercraft according to claim 19, wherein the speed detection unit includes a front insertion portion for inserting within the opening in the hull bottom plate and for abutting against a front wall surface for providing a water communication path to said paddle.

* * * * *